United States Patent [19]

DeVisser et al.

[11] Patent Number: 4,642,188
[45] Date of Patent: Feb. 10, 1987

[54] BACKWASH APPARATUS FOR MULTI ELEMENT FILTER UNIT

[75] Inventors: Richard B. DeVisser, Schoolcraft; Sydney Hagerty, Union, both of Mich.

[73] Assignee: Dover Corporation, Portage, Mich.

[21] Appl. No.: 738,937

[22] Filed: May 29, 1985

[51] Int. Cl.$^4$ .................. B01D 27/12; B01D 29/38
[52] U.S. Cl. .................. 210/333.1; 210/393; 210/411; 210/426; 210/427
[58] Field of Search .......... 210/333.1, 333.01, 393, 210/411, 412, 425, 426, 427

[56] References Cited

U.S. PATENT DOCUMENTS

| | | |
|---|---|---|
| 2,731,107 | 1/1956 | Hersey . |
| 3,161,591 | 12/1964 | Petter . |
| 3,256,678 | 6/1966 | Bertin . |
| 3,535,852 | 10/1970 | Hirs .................. 210/333.1 |
| 3,648,754 | 3/1972 | Sephton . |
| 3,692,178 | 9/1972 | Reece . |
| 3,703,465 | 1/1972 | Reece . |

Primary Examiner—Frank Sever
Attorney, Agent, or Firm—Flynn, Thiel, Boutell & Tanis

[57] ABSTRACT

A multi-element filter unit includes backwash apparatus and comprises a filter casing with provision for alternative, oppositely directed process liquid and backwash liquid flows therethrough. A plurality of filter tubes are close spaced within the filter casing. A flange engages the filter tubes and divides the filter casing into first and second chambers. Apparatus for sequentially backwashing the filter tubes during a backwash interval removes collected solids from between the filter tubes by flow of backwash liquid from one filter tube outward toward the exterior of adjacent filter tubes. The backwash apparatus includes poppet units aligned with open ends of the filter tubes and selectively actuable to close the opposed ends of ones of the filter tubes while leaving another open to backwash flow thereinto, such that each filter tube is backwashed in sequence while the others are closed against backwasing liquid flow thereinto, and diffuser structure which apportions, lengthwise of the filter tube, the rate of backwash liquid flow radially out through the wall of each filter tube.

10 Claims, 8 Drawing Figures

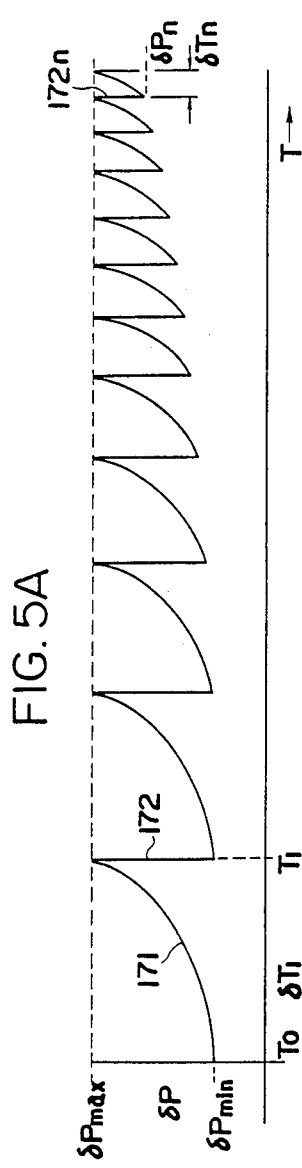
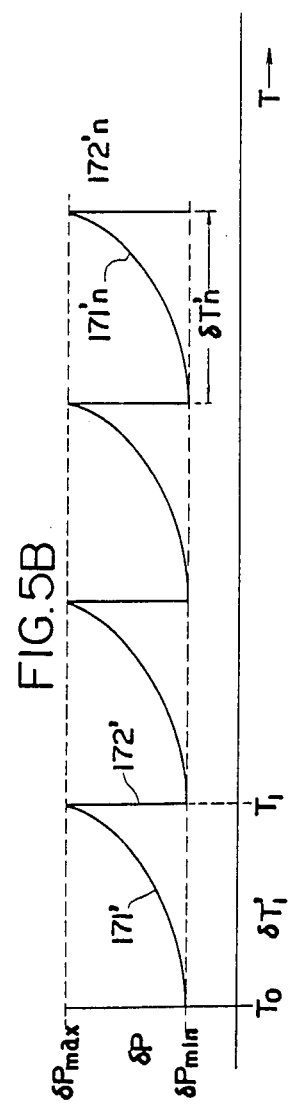

BACKWASH APPARATUS FOR MULTI ELEMENT FILTER UNIT

FIELD OF THE INVENTION

This invention relates to an improved filtering method and apparatus, particularly for backwashing of a pressure liquid filter unit having a plurality of filter tubes close spaced in a compact casing.

BACKGROUND OF THE INVENTION

Backwashable pressure filter units of the above-mentioned kind have long been used. They have the advantage of additional filter surface area as compared to filter units containing only a single filter tube. However, and particularly when handling difficult process liquids, there has been as tendency for prior plural tube filter units to progressively clog their filter tubes by a gradual building up of solids on the outside thereof despite periodic backwashing. Further, there has been observed a tendency to more rapid buildup of clogging solids toward the upper end of the filter tubes and in the upper part of the space closely surrounded by the several filter tubes within the filter casing.

In attacking these problems, Applicant has inserted into each of the filter tubes a spiral diffuser in the form of aC generally rigid twisted plate, or ribbon, preferably of stainless steel, so as to try to distribute the outflow of backwash liquid more evenly along the length of the filter tubes. Spiral diffusers have previously been known, for example from U.S. Pat. No. 3,256,678 (Bertin) for use in separation of gases by diffusion through a porous wall, and from U.S. Pat. No. 3,648,754 for use in reverse osmosis and hyperfiltration channels.

However, the mere insertion of spiral diffusers into the filter tubes did not eliminate the tendency to build up solids over a plurality of filtration-backwash cycles.

In dealing with this problem, Applicant recognized that much of the time in industrial installations it is difficult to obtain an adequate water supply for backwashing. In a typical filter unit containing three filter tubes, simultaneous backwashing of the filter tubes may require approximately 250 gallons of water per minute for even partially effective backwashing. This backwash liquid supply may be needed for only one or two minutes every four to six hours, particularly when a newly cleaned, or new, filter unit is first put in service. It is difficult to justify such a large water supply capability for such infrequent use since it requires large pumps, large piping and other correspondingly large equipment elements, as well as high energy input, all of which make a backwash water supply of this kind expensive to install and operate, particularly where in difficult filtration applications the filter unit may eventually clog and require disassembly and manual cleaning, a very expensive process in terms of lost operating time and labor expense.

It has been known to individually and in sequence backwash plural filter tubes in a single casing by means rotatable on the central axis of the casing and extending radially therefrom to engage a circular array of filter tubes. An example is Reece U.S. Pat. No. 3,703,465 (assigned to the assignee of the present invention) in which synchronously rotating backwash input and receiving arms respectively engage the open end of a filter tube and the opposite end of a subcasing thereof for a subinterval of a backwash period before rotating onto the next filter tube and subcasing in the circular array thereof. Since each filter unit has its own subcasing, this apparatus is more equivalent to a plurality of filter units each with a single filter tube. Hersey U.S. Pat. No. 2,731,107 provides a different example in which a hollow backwash arm is supported central to the casing for rotation therein and has a backwash liquid outlet which slides circumferentially along the circular array of filter tube ends to engage same one at a time. The apparatus disclosed by Hersey is for gas filtering not for pressure liquid filtering.

Prior rotating arm-type backwash systems are not suitable for compact pressure liquid filter units in which plural (for example three) filter tubes are close spaced within a single compact casing, since there is not adequate room for central location of rotational support and drive means for the rotating backwash arm nor for additional mechanism that may be required for limiting scuffing of the rotating backwash arm against the ends of the filter tubes. It may be quite impossible to apply the rotating arm-type backwash apparatus as an improvement to an existing compact filter unit, particularly to a close packed array thereof, simply because of inadequate space, and aside from questions of mechanical complexity, wear, mechanical limitations against backwashing of a filter tube out of sequence, etc.

According to the present invention, cleaning by backwashing can be made much more effective, to keep the filter unit operating in a clean or substantially clean condition over a large number of filtration-backwash cycles, so as to avoid frequent removal from service, tear-down and manual cleaning occurrences, even with significantly reduced backwash liquid flows. For example, under the present invention operation over many filtration-backwash cycles with effective backwashing and without significant degradation in filtration time has been achieved even with a reduction in water flow rate in the magnitude of from 250 gallons down to about 190 gallons per minute. Thus, it has been found possible under the present invention to minimize backwash liquid piping size, pump horsepower and other related installation and operating expense factors, and yet still provide improved backwash cleaning, and substantially reduce tendency toward solids buildup over multiple filtration-backwash cycles.

Accordingly, the objects and purposes of the present invention include provision of:

a backwash apparatus for a multi tube filter unit capable of operating at reduced backwash liquid flow rates and yet substantially reducing the tendency toward solids buildup and clogging, particularly in the area between adjacent faces of close spaced filter tubes and spaces in the casing closely surrounded by a plurality of filter tubes; and an apparatus as aforesaid which does not require increase in the diameter of the filter unit and is capable of new or replacement use in a wide variety of filtering applications, such as paper mills, oil refineries, and so forth.

Other objects and purposes of the invention will be apparent to persons acquainted with apparatus of this general kind upon reading the following description and inspecting the accompanying drawings.

The objects and purposes of the invention are met by providing a multi-element filter unit including a backwash apparatus comprising a filter casing with provision for alternative process liquid flow therethrough and backwash liquid flow in the opposite direction therethrough. Plural filter tubes are close spaced within the filter casing. A flange engages the filter tubes and divides the filter casing into first and second chambers. Apparatus for sequentially backwashing the filter tubes during a backwash interval removes collected solids from between the filter tubes by flow of backwash liquid from one filter tube outward toward the exterior of the adjacent filter tubes. This backwash apparatus includes poppet units opposed to the open ends of the filter tubes and selectively actuable to close the opposed ends of ones of the filter tubes while leaving another open to backwash flow therethrough, such that each filter tube is backwashed in sequence.

BRIEF DESCRIPTION OF THE DRAWINGS

FIGS. 5A and 5B are process liquid pressure drop versus time curves for a conventional apparatus and an apparatus in accord with the present invention, respectively.

DETAILED DESCRIPTION

Figure 1:
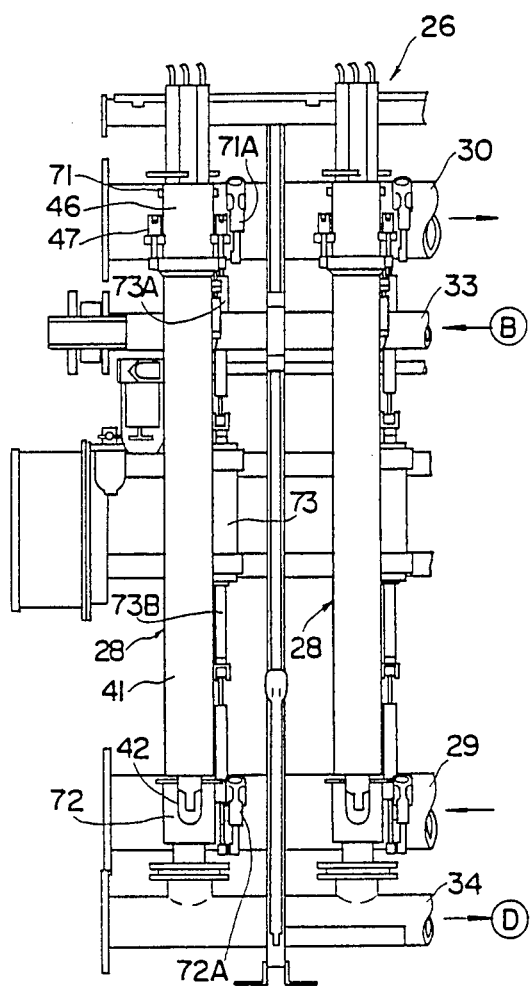
FIG. 1 is a fragmentary elevational view of a pressure liquid filter apparatus showing a pair of filter units.
Figure 1A:
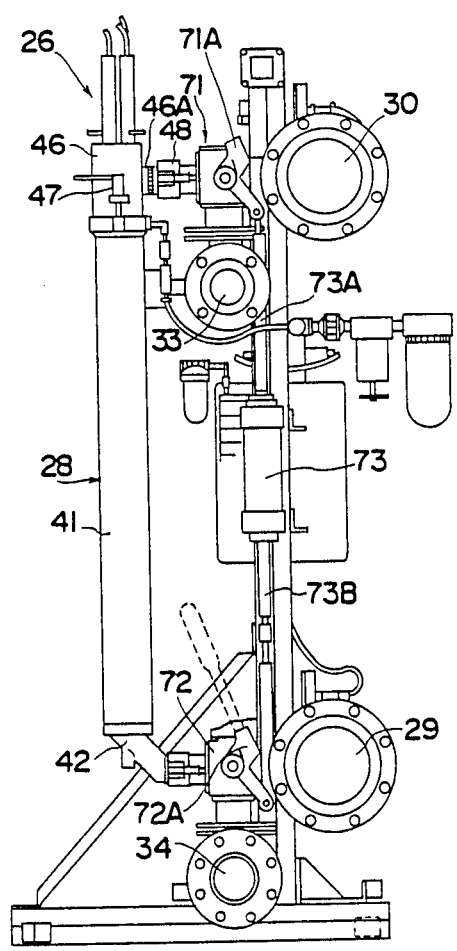
FIG. 1A is a right side view of the FIG. 1 apparatus.

FIG. 1 discloses a pressure filter apparatus 26 comprising at least one pressure filter unit 28. While the units 28 are usable singly, it is more typical to have several units 28 connected in parallel, two being shown in FIG. 1. Pressurized process liquid to be filtered flows into an inlet header 29 and thence into the lower ends of the pressure filter units 28. The process liquid flows upwardly through the pressure filter units and is filtered thereby to remove unwanted solids therefrom. The filtrate from the pressure filter units flows into a process liquid outlet header 30 and thence to a point of use not shown.

The respective pressure filter units 28 can be backwashed at selected intervals to remove contaminate buildup therefrom. For this purpose, a pressurized source B of any conventional type is actuable to flow a backwash liquid, such as water or a suitable solvent, from the top of a filter unit 28 downward therethrough to a backwash outlet header 34 and thence to an effluent drain system D. The top ends of the filter units 28 are connected by respective valves 71, whose actuators are visible at 71A, alternately to the process liquid outlet header 30 and backwash liquid inlet header 33. The lower ends of the filter units 28 are connected by respective valves 72 alternately to the backwash outlet header 34 and process liquid inlet header 29. The actuator for the valve 72 is indicated at 72A.

During the backwash cycle, the process liquid inlet header 29 and outlet header 30 do not communicate with the filter unit 28. Similarly, during the filtration cycle, the backwash inlet header 33 and backwash outlet header 34 do not communicate with the filter unit 28. The valves 71 and 72 are here operable automatically by the piston rods 73A and 73B of a double-ended pressure fluid cylinder 73 mounted fixedly with respect to the casing 41 and headers 29, 30, 33 and 34.

Figure 2:
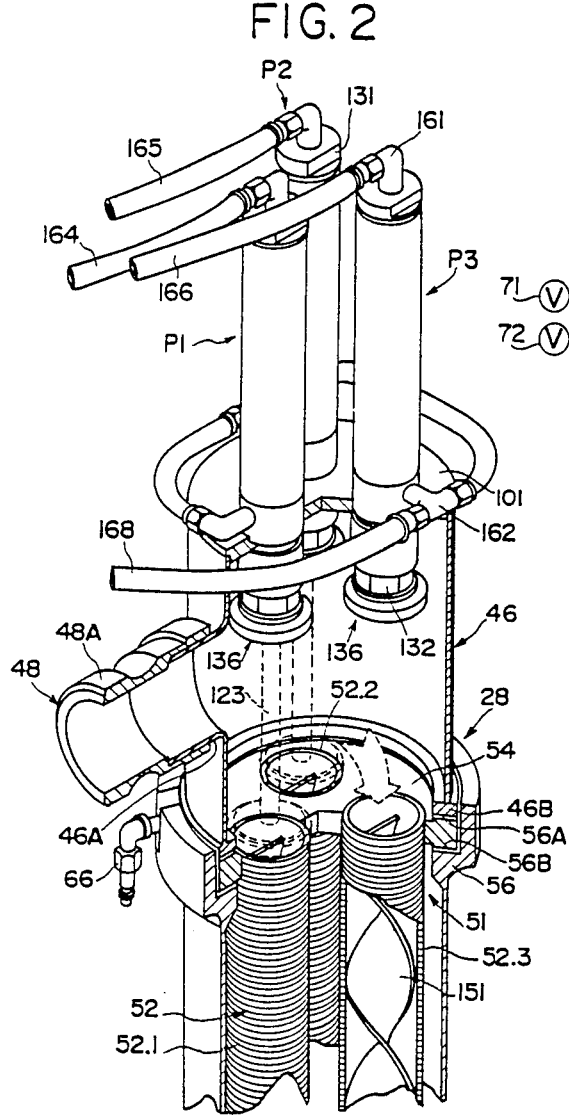
FIG. 2 is an enlarged, fragmentary, partially broken, pictorial view of the upper end portion of a filter unit of FIG. 1.
Figure 3:
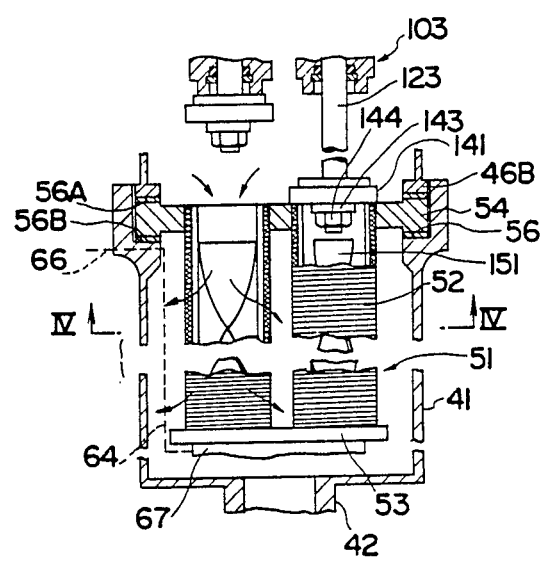
FIG. 3 is an enlarged fragmentary central cross-sectional view of the apparatus of FIG. 2.

As seen in FIGS. 1, 2 and 3, a given pressure filter unit 28 comprises a tubular outer housing or casing 41 which has an elbow 42 at its lower end connected to the respective valve 72, preferably by means of a quick-release coupling. The upper end of the outer casing 41 is capped by a fitting 46 connected thereto by another quick-release coupling 47 (FIG. 1). The fitting 46 has a port 46A connected by a further quick-release coupling 48, a portion of which is shown at 48A in FIG. 2, to the respective valve 71. The three mentioned quick-release couplings are of suitable commercially available type, for example cam or screw locking type, in order that the filter unit 28 can be quickly separated from the valves 71 and 72 and opened, for repair or replacement purposes.

A filter element 51 (FIGS. 2 and 3) is disposed within the tubular outer casing 41. The filter element comprises a plurality (in the embodiment shown three) of perforate filter tubes 52. An imperforate plate 53 closes the bottom ends of the tubes 52. The tubes 52 have a common annular flange 54 at their upper ends. The radially outer portion of the flange 54 rests on a shoulder 56 provided at the radially enlarged upper end of the outer casing 41. The lower end of the fitting 46 has a flange 46B at its lower end by which it is adapted to clamp the flange 54 in position on the casing 41. To avoid leakage, suitable seal rings 56A and 56B sandwich the flange 54 and in turn are sandwiched by the flange 46B and shoulder 56.

Optionally, an air-operated vibrator assembly 67 may be disposed within the outer casing 41 adjacent to or fixed to the bottom plate 53 of the filter element 51, for transmitting a high frequency, low amplitude vibration to the process liquid in the region of the filter area to ensure a high flow and positive clarification while maintaining a uniform condition of the slurry or process liquid being filtered.

Pressurized air to operate the vibrator assembly 67 is, as schematically indicated in FIGS. 2 and 3, supplied through a suitable pair of conduits, one of which is schematically indicated in broken lines at 64 in FIG. 3 and which extends between the vibrator assembly 67 within the outer casing 41 and a fitting 66 outside the casing. U.S. Pat. No. 3,161,591 shows one such vibrator assembly installation.

The filter tube 52 may be constructed in a wide variety of known ways. For example, the filter tube 52 can be made of a suitable reinforced metal screen or, as in the embodiment shown, same can be a slotted metal tube, here conventionally defined by a generally triangular cross section rod spirally wrapped around upright supports to define filtration slots between the wraps. The present invention is not concerned with details of construction of the filter tube 52 and further description thereof is believed unnecessary.

The apparatus, to the extent above described, is conventional and may be of the type shown in U.S. Pat. No. 3,692,178 assigned to the assignee of the present invention. Although that patent shows only one filter tube 52 within the outer casing 41, units have been manufactured for several years with three smaller diameter filter tubes symmetrically arranged (even circumferentially spaced) with respect to the central axis of the outer casing 41 so as to be equally spaced from each other and from the interior wall of the outer casing 41, with the upper ends thereof being fixed to the flange 54 substantially in the manner shown in present FIGS. 2-4.

Turning now to the subject matter more directly embodying the present invention, the fitting 46 atop the outer casing 41 is of generally cylindrical, inverted cup shape, except for the outlet port 46A thereof. The top 101 of the fitting 46 closes same and conveniently is formed as a flat plate. The top plate 101 serves as a mounting deck for a plurality of poppet units P coaxially aligned above respective ones of the filter tubes 52. In the embodiment shown, three filter tubes 52 are provided (specifically at 52.1, 52.2 and 52.3), and hence three corresponding poppet units P1, P2 and P3 are provided.

Each poppet unit (for example, poppet unit P1 of FIG. 2A) comprises a double-acting air cylinder, hereafter referred to as a drive cylinder 103. The drive cylinder 103 comprises a cylindrical casing 105 recessed in and upstanding from the deck 101. A reduced diameter, externally threaded extension 106 protrudes coaxially downward from the bottom of the casing 105 through an opening in the deck 101. An internally threaded sleeve 108 threads onto the lower end of the threaded extension 106 and abuts the underside of the deck 101, in nut and bolt fashion, to fixedly secure the drive cylinder 103 to the deck 101.

A piston 111 is vertically reciprocable within the casing 105 and carries a pressure seal ring 112 in a conventional manner to seal between the upper and lower chambers 116 and 117 of the casing 105. A piston rod 123 fixedly depends from the piston 111 and extends downward through a coaxial opening in the bottom 125 of the casing 105 and extension 106 and thence through a coaxial opening in the bottom of the sleeve 108. Seals 127 and 128 located in the bottom ends of the drive cylinder casing 105 and sleeve 108 engage the piston rod 123 slidably. The former acts as an air pressure seal. A further seal 129 is sandwiched between the top of the sleeve 108 and the deck 101. The seals 128 and 129 prevent entry of pressurized process liquid and backwash liquid into sleeve 108. The seals 112 and 127-129 are preferably of conventional type, e.g. resilient O-ring seals.

Flats 131 and 132 are provided on the top of the drive cylinder casing 105 and bottom of the sleeve 108 for engagement by a tool, such as a wrench, to facilitate threaded tightening of the sleeve 108 with respect to the casing 105 to tightly and rigidly sandwich the deck 101 therebetween.

The piston rod 123 protrudes downward through the bottom end of the sleeve 108. The bottom end of the piston rod 123 carries a stopper unit 136. The bottom of the piston rod 123 is a reduced diameter threaded end portion 137 depending from a downward facing shoulder 138. A rigid stopper disk 141 is held firmly up against the shoulder 138 by a lock washer 143 and nut 144 respectively slidably and threadedly coaxially secured on the threaded end portion 137 of the piston rod. A resilient washer 146 is fixed (as by vulcanizing) coaxially atop the stopper disk 141 and acts, when the stopper unit is retracted, as a secondary seal against pressure liquid leakage into the shell 108. The resilient washer also cushions and quiets contact of shock and damage to the stopper unit 136 against the lower end of the sleeve 108 upon retraction of the piston rod 123. The piston 111 has a sufficient stroke as to move the stopper disk 141 from its retracted position of FIGS. 2 and 2A, snug against the bottom of the sleeve 108, to its dotted line position in FIG. 2 (solid line position of FIG. 3) wherein the stopper disk 141 seats firmly atop the upper end of the coaxially aligned filter tube 52. The outside diameter of the stopper disk 141 is equal to or slightly exceeds the outside diameter of the top of the filter tube 52. The outside diameters of the washer 143 and nut 144 are less than the inside diameter of the filter tube 52 so as to freely enter the top thereof as seen in FIG. 3.

Thus, the cylinder casings 105 extend upwardly in parallelism and circumferential symmetry from the top of the deck 101, the corresponding sleeves and stopper units 136 depending into the interior of the fitting, the stopper units 136 being, in their retracted position shown in FIG. 2, spaced above the tops of the corresponding, coaxially aligned filter tubes 52.

A spirally twisted plate or ribbon backwash diffuser 151 of generally known type is snugly and thereby fixedly received coaxially within each tube 52. In the embodiment shown, the spiral diffuser 151 extends from the bottom plate 53 up to a point spaced below the top of the filter tube 52 by a distance slightly exceeding the combined height of the washer 143, nut 144 and protruding end of the threaded end portion 137 of the push rod. A clearance is thus established between the bottom of the piston rod 123 and the top of the spiral diffuser 151. The spiral diffuser 151 is removably held within the filter tube 52, here by a friction fit.

Figure 2A:
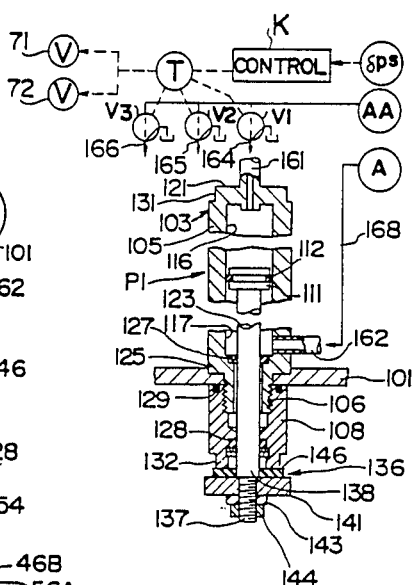
FIG. 2A is an enlarged, fragmentary, central cross-sectional view of a poppet unit of FIGS. 1 and 2 and schematically showing a control system therefor.

Connected to the top and bottom of the casing 105 of each of the poppet units P1-P3 are conventional pressure fluid fittings (preferably pressurized air fittings) 161 and 162 for pressurizing the top and bottom of the piston 111 of each poppet unit. Separate pressurized air lines 164-166 connect to the fittings 161 at the top of the poppet units P1-P3, respectively, as seen in FIGS. 2 and 2A. A common single pressurized air line 168 connects to the bottom fittings 162 of all of the poppet units P1-P3. A first conventional source A of pressurized air supplies the common line 168 continuously so as to continuously pressurize the lower chamber 117 of each of the poppet units P1-P3, with the result that the stopper units 136 of all poppet units P1-P3 are normally in their upward (retracted) position shown in solid line in FIGS. 2 and 2A. A second conventional pressurized air supply AA connects to the respective lines 164-166 to the tops of the poppet units P1-P3 through respective valves V1-V3. The valves V1-V3 are normally in their solid line position shown in FIG. 2A wherein they vent the top of the casing 105 of their respective poppet unit P1-P3.

The valves V1-V3 are separately actuable from their normal solid line position shown, to shift each to its dotted line position shown in FIG. 2, so as to apply air pressure from pressurized air source AA therethrough to the upper chamber 116 of the respective poppet unit P1. The source AA is at a higher pressure than source A, e.g. 40 and 30 p.s.i. respectively. The downward force of the pressurized air from source AA in the upper chamber 116 thus overcomes the upward force of the air pressure from source A normally existing in lower chamber 117, so as to drive the piston 111 downward and therewith cause the corresponding stopper unit to close the upper end of the corresponding filter tube 52 therebelow, as shown at the right in FIG. 3, thereby blocking flow between the fitting 46 and the upper end of that filter tube 52.

OPERATION

Although the operation of the filter system has been indicated above, same will be summarized below for convenient reference. Under the present invention, all poppet units P1-P3 are vented by their respective valves V1-V3, and their stopper units 136 are thus raised, during normal filtration operation. Normal filtration flow is thus conventional, namely liquid to be filtered passes under pressure through the inlet header 29 (FIG. 1) and the elbow 42 of a given filter unit 28 upward into the casing 41 thereof, thence for filtering of unwanted solids therefrom radially inward into the filter tubes 52, thence upward through the open upper ends of the filter tubes into the fitting 46 (FIG. 2) and then out through the fitting 48 and process liquid outlet header 30 to a point of use.

On the other hand, when filtering over a period of time has begun to clog the filter tubes 52 and hence reduce flow rate therethrough and increase the pressure drop thereacross, it is customary to backwash the filter tubes 52 by shifting the valves 71 and 72 so as to flow backwash liquid from backwash inlet header 33 through the fitting 48 into the top fitting 46, thence downward through the open upper ends of the filter tubes 52 to dislodge unwanted solids material. The backwash liquid and entrained unwanted solids material flows down through the elbow 42 and out the backwash outlet header 34 all in a conventional manner.

However, in prior multiple filter tube pressure filter units, where the solids entrained in the process liquid tend to rapidly clog the filter tubes and are difficult to backwash off the outer surface of the filter tubes, with even reasonably high backwash liquid pressures, there have been instances of gradual build up of a contamination layer on the outside of the filter tubes 52. This contamination layer tends to be heaviest near the top of the tubes and where the tubes closely face each other, namely, in the central area of the casing 41 in the three-tube array shown in the present drawings. More particularly, in FIG. 4, the arrow C points to the latter central area of typical heavy contamination. Indeed, after repeated filtration and backwash cycles, contamination layers on the adjacent faces of the several filter tubes 52 may bridge, forming a clot filling the central area C of the casing 41. The conventional result is represented in FIG. 5A wherein the pressure drop dP across a given filter unit 28 is shown at 171 to rise gradually during filtration to a maximum permitted pressure differential dPmax over a time $(T_1-T_0)$ $dT_1$. When the maximum pressure difference dPmax has been reached, the system is then backwashed at time $T_1$, for example, to cause, as indicated at 172, a drop in the pressure differential across the filter tubes 52. The progressive clogging tendency over successive filtration-backwash cycles mentioned above leads to the situation seen in the right-hand portion of FIG. 5A in which the backwash portion $172_n$ of the nth filtration-backwash cycle cannot drive the pressure drop dP back down to the desired minimum dPmin, but rather only down to some intermediate pressure differential dPn. Further, the time interval taken to reclog the filter tubes and return the pressure differential to dPmax is now considerably shorter as at $dT_n$. Accordingly, less time is spent filtering and more time is spent backwashing to less effect, until eventually (if the showing of FIG. 5A were extended further rightwardly) the pressure differential after backwashing would eventually become the same as dPmax, the pressure at which backwashing is made to commence, or in other words the filter tubes would become irretrievably clogged and all filtration would cease.

Normally before this happens it has been conventional in such extreme cases to require manual disassembly of the filter unit and hand-cleaning of the individual filter elements, which disadvantageously requires considerable down time of the filter apparatus and process liquid machinery served thereby, and considerable expense for cleaning and disassembly labor.

The present invention avoids this difficulty. More particularly, the present invention is intended, under circumstances like those represented by FIG. 5A, to instead maintain operation of the filter unit in accord with FIG. 5B over at least a long period of time. More particularly, the present invention is intended to maintain the character of the pressure differential dP versus time T curves for filtration and backwash (indicated at 171' and 172' respectively in FIG. 5B) substantially the same over an extended period of time, such that a given subsequent characteristic $171'_n$ and $172'_n$ will be substantially the same as initial characteristic 171' and 172' and such that the time duration $dT'_n$ of a given subsequent filtration cycle will be substantially the same as the initial one at $dT'_1$. In other words, the present invention is intended, under similar circumstances, to not allow a buildup of solids of appreciable amount around the filter tubes 52 over a number of filtration-backwash cycles.

Under the present invention, after a period of filtration during which solids build up on the outside of the filter tubes and increase the pressure difference dP across the filter tubes to some pressure differential dPmax, it is desirable to stop filtration and perform a backwash subcycle.

It is conventional to provide the pressure sensor schematically indicated at dPS in FIG. 2A to sense the pressure differential dP across the process liquid inlet and outlet headers 29 and 30, and to thereby actuate a conventional control K to switch the state of the valves 71 and 72 from filtration to backwash.

Figure 4:
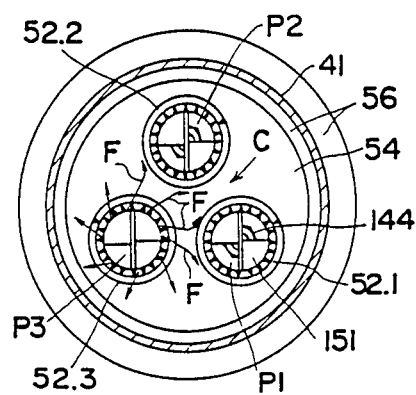
FIG. 4 is a central cross-sectional view substantially taken on the line IV—IV of FIG. 3.

In a conventional system, backwash liquid flows simultaneously into the upper ends of all of the filter tubes 52 in the casing 41. However, in the present invention, the control K, in addition to switching the valves 71 and 72 to backwash mode, also actuates control circuitry (for example a multi-interval timer unit T) for the individual poppet units P1-P3. Upon such actuation, the timer T switches all but one of the poppet control valves, for example switches valves V1 and V2, to their dotted line position to supply pressurized air to the top of the pistons 111 of the respective poppet units P1 and P2, thereby driving downward their stopper units 136 to close the upper ends of the aligned pair of filter tubes 52.1 and 52.2. The valve V3 is left in its normal solid line position, continuing to vent the upward chamber 116 of the casing the poppet unit P3. The poppet unit P3 thus remains retracted with its stopper unit 136 spaced well above the upper end of the coaxially aligned filter tube 52.3 as shown in FIG. 2. Backwash liquid entering the fitting 46 from the coupling 48 thus can enter only the upper end of the filter tube 52.3 disposed below the poppet unit P3. The result, looking upward in FIG. 4, is that backwash flow out of the filter tube 52 below the poppet unit P3 not only tends to push collected solids off the exterior surface of the filter tube, but as indicated by the arrows F also tends to flush material tangentially off the adjacent faces of the filter tubes 52.1 and 52.2 whose tops are closed by the poppet units P1 and P2, and also tends to push solids out of the central area C between the three filter tubes 52. This backwash flow F out of one filter tube 52.3 toward the center C of the set of tubes 52 and toward the adjacent faces of the other filter tubes 52.1 and 52.2 is of course unimpeded by any flow out of these other filter tubes 52 because their upper ends are closed by their respective poppet units P1 and P2 such that no backwash flow can enter same. Accordingly, the backwash flow at F out of one filter tube 52.3 does not have to fight against backwash flows out of the adjacent filter tubes 52.1 and 52.2. Further, with only one of the several filter tubes open, the pressure and flow rate of backwash liquid entering it are higher than if all of the filter tubes were simultaneously open to receive backwash liquid flow. The result is enhanced cleaning not only of the particular filter tube 52.3 being backwashed but also enhanced cleaning of the adjacent surfaces of the other filter tubes and of the central area C bounded by the filter tubes. Backwash liquid flow rate into a given filter unit 28 and consequently backwash liquid pump horsepower can thus be reduced from conventional levels while attaining improved backwash cleaning.

Further, the spiral diffuser 151 within the filter tube 52.3 being backwashed reduces the tendency of the backwash liquid to pass to the bottom of the filter tube 52 before moving radially outward through the porous wall thereof, and instead more evenly distributes the outflow over the full length of the filter tube. Thus, the filter tube 52.3 is cleaned more evenly from top to bottom. However, there is also an improvement in uniformity from top to bottom of the effect above discussed with respect to FIG. 4 and the arrows F therein. More particularly, the backwashing of one filter tube 52.3 equipped with a spiral diffuser 151 tends to flush the adjacent outer surfaces of the adjacent tubes 52.1 and 52.2 and clean out the center portion C within the casing 41 not only adjacent the bottoms of the filter tubes 52 but also adjacent the mid portions and upper ends thereof in a generally uniform manner. Hence, in the present invention, the spiral diffusers 151 provide a new result in combination with the plunger units P1–P3.

After the first filter tube is sufficiently cleaned (in this example due to timing out of a section of the timer T, the air pressure valves V1–V3 are switched, for example to retract the stopper unit 136 of the poppet unit P1 and extend the stopper unit 136 of the poppet unit P3. The upper ends of the filter tubes 52.2 and 52.3 are thus closed and that of filter tube P1 is now open. Thus, backwash liquid coming into the fitting 46 will all be diverted into the now open top of the filter tube 52.1 below the poppet unit P1. The operation is the same as above described with respect to poppet unit P3 and the backwashing of the filter tube 52.3 located coaxially therebelow.

Backwashing continues in this manner, until all of the filter tubes 52 have been individually backwashed in the desired sequence. After all of the filter tubes 52 within the casing 41 have been appropriately backwashed, as determined e.g., by timer unit T, the valves V1–V3 are all returned to their solid line, or filtration, positions as are the valves 71 and 72, thus placing the apparatus in conventional filtration mode.

When the period of filtration has once again driven up the pressure differential across the process liquid inlet and outlet headers to the level dPmax, same can be conventionally sensed at the sensor dPS to initiate another backwash cycle of the kind above described.

Such operation can continue through a plurality of filtration-backwash cycles as indicated in FIG. 5B.

While the disclosed embodiment has three filter tubes 52, other numbers are contemplated, e.g., an array of seven with a central filter tube surrounded closely by six others and opposed by a corresponding array of seven poppet units coaxial therewith.

Although the disclosed embodiment initiates backwashing of a filter unit 28 in response to a rise in pressure differential to a maximum dPmax, backwashing may if desired be initiated instead by other conditions, e.g., by passage of a predetermined time, namely at predetermined time intervals.

Although a particular preferred embodiment of the invention has been disclosed in detail for illustrative purposes, it will be recognized that variations or modifications of the disclosed apparatus, including the rearrangement of parts, lie within the scope of the present invention.

An alternative poppet unit uses pneumatic actuation but with the piston prebiased by a spring.

The embodiments of the invention in which an exclusive property or privilege is claimed are defined as follows:

1. A multielement filter unit including a backwash apparatus, comprising:
   a filter casing; means for flowing process liquid in one direction through the casing and alternately flowing backwash liquid in the opposite direction through said casing;
   a plurality of filter tubes close spaced within said filter casing and having one end open to expel filtered process liquid and alternately receive backwash liquid;
   flange means engaging said filter tubes adjacent their open ends and dividing said filter casing into first and second chambers with said open ends of said filter tubes opening through said flange means into said second chamber;
   means designed for minimizing installation and operating expense factors in a compact liquid filter in a compact liquid filter unit having plural filter tubes closely spaced within a single compact casing, for providing improved backwash cleaning and for substantially reducing the tendency toward solids buildup over multiple filtration-backwash cycles, including:
   (a) a plurality of closure means each shiftable from a first location spaced during filtration from said open end of a corresponding said filter tube for allowing unimpeded filtration flow through said corresponding filter tube to a second location closing said corresponding filter tube against flow therethrough;
   (b) means actuable in the backwash mode of the apparatus for causing some of said closure means to close the opposed open ends of corresponding ones of said filter tubes while leaving the end of at least one of said filter tubes open by leaving the corresponding closure means spaced therefrom, said filter tubes being sequentially actuable during backwashing such that each of the filter tubes has its one end open for at least a part of the backwashing time while the one ends of others of the filter tubes are closed by actuation of their corresponding closure means.

2. The apparatus of claim 1 in which said closure means include respective poppet units coaxially aligned with the open ends of the filter tubes and having respective shiftable stopper units normally spaced from said filter tubes in the filtration mode of the filter unit and in parts of the backwash mode thereof, said stopper units including three selectively actuable to close the opposed ends of first and second ones of three adjacent filter tubes and leave the third open to backwash flow thereinto, wherein successive pairs of said stopper units close the opposed ends of their respective filter tubes, such that each of said three adjacent filter tubes is backwashed in sequence while the other two of said adjacent three are closed against backwashing liquid flow thereinto.

3. A multielement filter unit including a backwash apparatus, comprising:
   a filter casing;
   process liquid inlet and backwash liquid outlet means at one end of said casing;
   process liquid outlet and backwash liquid inlet means at the other end of said casing;
   a plurality of filter tubes spaced within said filter casing and having one end adjacent said one end of said filter casing and the other end thereof adjacent said other end of said filter casing;
   flange means engaging said filter tubes adjacent said other ends thereof and dividing said filter casing into first and second chambers respectively communicating with said first and other ends of said filter tubes, said other ends of said filter tubes opening through said flange means into said second chamber, said filter tubes being closely spaced from each other, the distance between adjacent filter tubes being not more than about the filter tube radius, said filter tubes lying parallel to each other, three adjacent filter tubes being grouped in mutually close spaced relation to form a compact cluster closely surrounding a narrow open zone therebetween;
   means designed for minimizing installation and operating expense factors in a compact liquid filter in a compact liquid filter unit having plural filter tubes closely spaced within a single compact casing, for providing improved backwash cleaning and for substantially reducing the tendency toward solids buildup over multiple filtration-backwash cycles, including:
   means for removing collected solids from said open zone by flow of backwash liquid from one said filter tube outward through said open zone around the exterior of the adjacent filter tubes, said removing means including stopper units coaxially aligned with the open ends of the filter tubes, said stopper units being normally spaced from said filter tubes in the filtration mode of the filter unit and in parts of the backwash mode thereof, said stopper units including three selectively actuable to close the opposed ends of first and second ones of said three adjacent filter tubes against flow therethrough leaving the third filter tube open to backwash flow thereinto, wherein successive pairs of said poppet units close the opposed ends of their respective filter tubes, such that each of said three adjacent filter tubes is backwashed in sequence while the other two of said adjacent three are closed against liquid flow therethrough.

4. The apparatus of claim 3 including spiral diffusers snugly inserted in said filter tubes and running substantially the length thereof, the tops of the spiral diffusers terminating in spaced relation inboard from the open other end of the respective filter tube.

5. The apparatus of claim 3 in which said filter unit casing has a hollow inverted cuplike fitting fixed to the other end thereof and extending beyond the normally open other ends of the filter tubes, a flange surrounding the other ends of said filter tubes and extending to the peripheral wall of the casing to separate the interior of the casing from the interior of the fitting, the free end of the fitting being formed as a deck, said removing means including poppet units carrying said stopper units, said poppet units being fixed to said deck and extending outward therebeyond in parallel relation, said poppet units each comprising a pressure fluid cylinder including a reciprocable piston and piston rod, said piston rod extending into the interior of said fitting and carrying a said stopper unit, said piston rod being extensible to shift said stopper unit into closing relation with the coaxially opposed end of the corresponding filter tube, 6. The apparatus of claim 5 in which said poppet unit includes means for continuously feeding fluid under pressure to the side of said piston adjacent said stopper unit at a sufficient pressure to cause the piston to retract the piston rod, means actuable to apply fluid under pressure selectively to the other side of the piston with sufficient pressure to extend the piston rod and hence apply the stopper unit to close the opposed end of the respective filter tube.

7. The apparatus of claim 6 including means actuable during the backwash mode of the apparatus for sequentially actuating ones of the poppet units to close their respective filter tubes against backwash flow while leaving one said filter tube open to backwash flow, such that successive ones of the filter tubes are open to backwash flow while the remaining ones are closed.

8. The apparatus of claim 3, in which said plurality of filter tubes is three filter tubes.

9. The apparatus of claim 3, in which the plurality of filter tubes exceeds three filter tubes.

10. A multielement filter unit including a backwash apparatus, comprising:
    a filter casing;
    means for flowing process liquid in one direction through the casing and alternately flowing backwash liquid in the opposite direction through said casing;
    a cluster of filter tubes close spaced from each other and located within said filter casing and closely surrounding a narrow open space therebetween, said filer tubes each having one end open to expel filtered process liquid and alternately receive backwash liquid;
    flange means engaging said filter tubes adjacent their open ends and dividing said filter casing into first and second chambers with said open ends of said filter tubes opening through said flange means into said second chamber;
    means designed for minimizing installation and operating expense factors in a compact liquid filter in a compact liquid filter unit having plural filter tubes closely spaced within a single compact casing, for providing improved backwash cleaning and for substantially reducing the tendency toward solids buildup over multiple filtration-backwash cycles, including:

(a) a cluster of closure means having first positions opposed to and spaced during filtration from said open end of said filter tube for allowing unimpeded filtration flow through said filter tubes and each having a second position closing the opposed filter tube to block all flow therethrough;

(b) means actuable in the backwash mode of the apparatus for causing said closure means to close the opposed open ends of all but one of said filter tubes of said cluster while leaving the end of said one filter tube open by leaving the corresponding closure means spaced therefrom, said filter tubes of said cluster being sequentially backwashed one at a time, wherein each filter tube has its one end open for at least a part of the backwashing time while the one ends of other filter tubes are closed;

(c) backwashing means for flowing backwash liquid through the open end of one filter tube and out from said tube through said space along the outside of the other filter tubes of said cluster to dislodge caked solids on said others, while preventing filtration flow of liquid through said other filter tubes to reduce sticking of solids to said other filter tubes due to suction.

* * * * *

UNITED STATES PATENT AND TRADEMARK OFFICE
CERTIFICATE OF CORRECTION

PATENT NO. : 4,642,188

DATED : February 10, 1987

INVENTOR(S) : Richard B. DeVisser et al.

It is certified that error appears in the above-identified patent and that said Letters Patent is hereby corrected as shown below:

Column 11, line 63, "poppet" should read -- stopper --.

Column 13, line 3, "tube" should read -- tubes --.

Signed and Sealed this

Twenty-second Day of December, 1987

Attest:

DONALD J. QUIGG

Attesting Officer

Commissioner of Patents and Trademarks